United States Patent
Taurasi

(10) Patent No.: US 7,352,081 B2
(45) Date of Patent: Apr. 1, 2008

(54) CONTROL METHOD AND DEVICE FOR ACTIVATING AND DEACTIVATING THE CHILD SAFETY LOCK FUNCTION OF VEHICLE DOORS

(75) Inventor: Marco Taurasi, Livorno (IT)

(73) Assignee: Intier Automotive Closures S.p.A. (IT)

( * ) Notice: Subject to any disclaimer, the term of this patent is extended or adjusted under 35 U.S.C. 154(b) by 0 days.

(21) Appl. No.: 11/349,568

(22) Filed: Feb. 7, 2006

(65) Prior Publication Data

US 2006/0181152 A1    Aug. 17, 2006

Related U.S. Application Data

(60) Provisional application No. 60/653,460, filed on Feb. 16, 2005.

(51) Int. Cl.
| | |
|---|---|
| *B60L 1/00* | (2006.01) |
| *B60L 3/00* | (2006.01) |
| *H02G 3/00* | (2006.01) |
| *B60R 25/00* | (2006.01) |
| *B60R 22/00* | (2006.01) |
| *H01H 47/22* | (2006.01) |
| *B60Q 1/00* | (2006.01) |
| *G06F 13/42* | (2006.01) |
| *B60K 28/00* | (2006.01) |
| *E05B 53/00* | (2006.01) |

(52) U.S. Cl. ............... 307/10.1; 307/9.1; 307/10.1; 307/10.2; 340/426.28; 340/426.35; 340/426.36; 340/438; 340/825; 340/5.31; 340/5.72; 340/5.61; 340/457.4; 180/272; 180/274; 180/279; 180/287; 180/289; 701/45; 701/49; 70/264

(58) Field of Classification Search ............... 307/10.1, 307/10.2, 9.1; 340/426, 438, 18, 825, 426.28, 340/426.35, 426.36, 5.31, 5.72, 5.61, 457.4; 70/264; 180/272, 274, 279, 287, 289; 701/45, 701/49

See application file for complete search history.

(56) References Cited

U.S. PATENT DOCUMENTS

| 4,652,768 A | 3/1987 | Gmeiner et al. |
| 5,054,300 A | 10/1991 | Nakahara et al. |
| 5,574,315 A * | 11/1996 | Weber ........................ 307/10.1 |
| 5,698,907 A * | 12/1997 | Weber ........................ 307/10.1 |
| 5,894,906 A | 4/1999 | Weber |
| 6,157,090 A | 12/2000 | Vogel et al. |

(Continued)

Primary Examiner—Bao Q. Vu
Assistant Examiner—Jue Zhang
(74) Attorney, Agent, or Firm—Clark Hill PLC

(57) ABSTRACT

A control device is provided for activating and deactivating a child safety lock function of rear doors of a motor vehicle. The control device includes a safety lock device connected to rear inside door handles of the rear doors. The control device also includes a central control unit for controlling the safety lock device between a first operating position that defines a normal operating mode, in which the safety lock device allows the rear doors to be opened using both the rear inside door handles and the rear outside door handles, and a second operating position that defines a safety lock mode, in which the safety lock device does not allow the rear doors to be opened using the rear inside door handles. A selector device is included for manually selecting between the normal operating mode and the safety lock mode. A temporary consent button is included for manually activating a temporary consent function, which temporarily deactivates the safety lock mode, thereby temporarily reactivating the normal operating mode.

5 Claims, 2 Drawing Sheets

U.S. PATENT DOCUMENTS

| | | |
|---|---|---|
| 6,650,025 B2 | 11/2003 | Li |
| 6,717,290 B2 | 4/2004 | Hirota et al. |
| 6,879,058 B2 | 4/2005 | Lorenz et al. |
| 6,883,839 B2 | 4/2005 | Belmond et al. |
| 2003/0222758 A1* | 12/2003 | Willats et al. ............. 340/5.72 |
| 2004/0124027 A1* | 7/2004 | Aiyama et al. ............... 701/49 |
| 2004/0195845 A1* | 10/2004 | Chevalier ................... 292/201 |
| 2004/0225419 A1* | 11/2004 | Sakai et al. .................... 701/1 |
| 2005/0023858 A1* | 2/2005 | Bingle et al. ................. 296/76 |
| 2005/0146215 A1* | 7/2005 | Kachouh et al. ........... 307/10.1 |

\* cited by examiner

CONTROL METHOD AND DEVICE FOR ACTIVATING AND DEACTIVATING THE CHILD SAFETY LOCK FUNCTION OF VEHICLE DOORS

CROSS-REFERENCE TO RELATED APPLICATION

This application claims priority to and all the benefits of U.S. Provisional Application Ser. No. 60/653,460, filed on Feb. 16, 2005 and entitled "Control Method And Device For Activating And Deactivating The Child Safety Lock Function Of Vehicle Doors."

BACKGROUND OF THE INVENTION

1. Field of the Invention

The present invention relates to a control method and device for activating and deactivating a child safety lock function of motor vehicle doors.

2. Description of the Related Art

As is known in the art, rear doors of motor vehicles are frequently equipped with safety lock devices to prevent the doors from being opened accidentally by operating the inside door handles when the motor vehicle is moving. Known safety lock devices may be mechanical or electrical and, in the latest embodiments, can be activated and/or deactivated manually by means of a control button usually located on the dashboard. When the button is pressed, the safety lock device is activated to lock the rear doors, which, since the inside handles are deactivated, can then only be opened using the outside handles. To open the doors from inside the vehicle, the control button must be pressed again to deactivate the safety lock device.

Given the above operating principle, use of and, consequently, the degree of safety of children transported in motor vehicles equipped with known safety lock devices therefore depend entirely on the driver or one of the passengers, who, when necessary, must always activate and/or deactivate the safety lock device manually using the control button. The effectiveness of this type of safety lock device therefore depends on the attentiveness of the driver/passenger of the motor vehicle, who may possibly neglect to activate/reactivate it, e.g. in the event the safety lock device has been deactivated to allow a passenger to open one of the rear doors.

It is an object of the present invention to provide a control method and device for activating and deactivating a child safety lock function of motor vehicle doors to improve the degree of safety afforded by such devices.

SUMMARY OF THE INVENTION

According to one aspect of the invention, a control device is provided for activating and deactivating a child safety lock function of rear doors of a motor vehicle. The control device includes a safety lock device connected to rear inside door handles of the rear doors. The control device also includes a central control unit for controlling the safety lock device between a first operating position that defines a normal operating mode, in which the safety lock device allows the rear doors to be opened using both the rear inside door handles and the rear outside door handles, and a second operating position that defines a safety lock mode, in which the safety lock device does not allow the rear doors to be opened using the rear inside door handles. A selector device is included for manually selecting between the normal operating mode and the safety lock mode. A temporary consent button is included for manually activating a temporary consent function, which temporarily deactivates the safety lock mode, thereby temporarily reactivating the normal operating mode.

According to another aspect of the invention there is provided, a method of activating and deactivating a child safety lock function of rear doors of a motor vehicle utilizes a safety lock device controllable between a first operating position, establishing a normal operating mode, in which the rear doors can be opened using rear inside door handles and rear outside door handles, and a second operating position, establishing a safety lock mode, in which the rear doors cannot be opened using the rear inside door handles. The method of activating and deactivating the child safety lock function includes the steps of: controlling the safety lock device between the normal operating mode and the safety lock mode; and temporarily deactivating the safety lock mode, thereby temporarily reactivating the normal operating mode.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
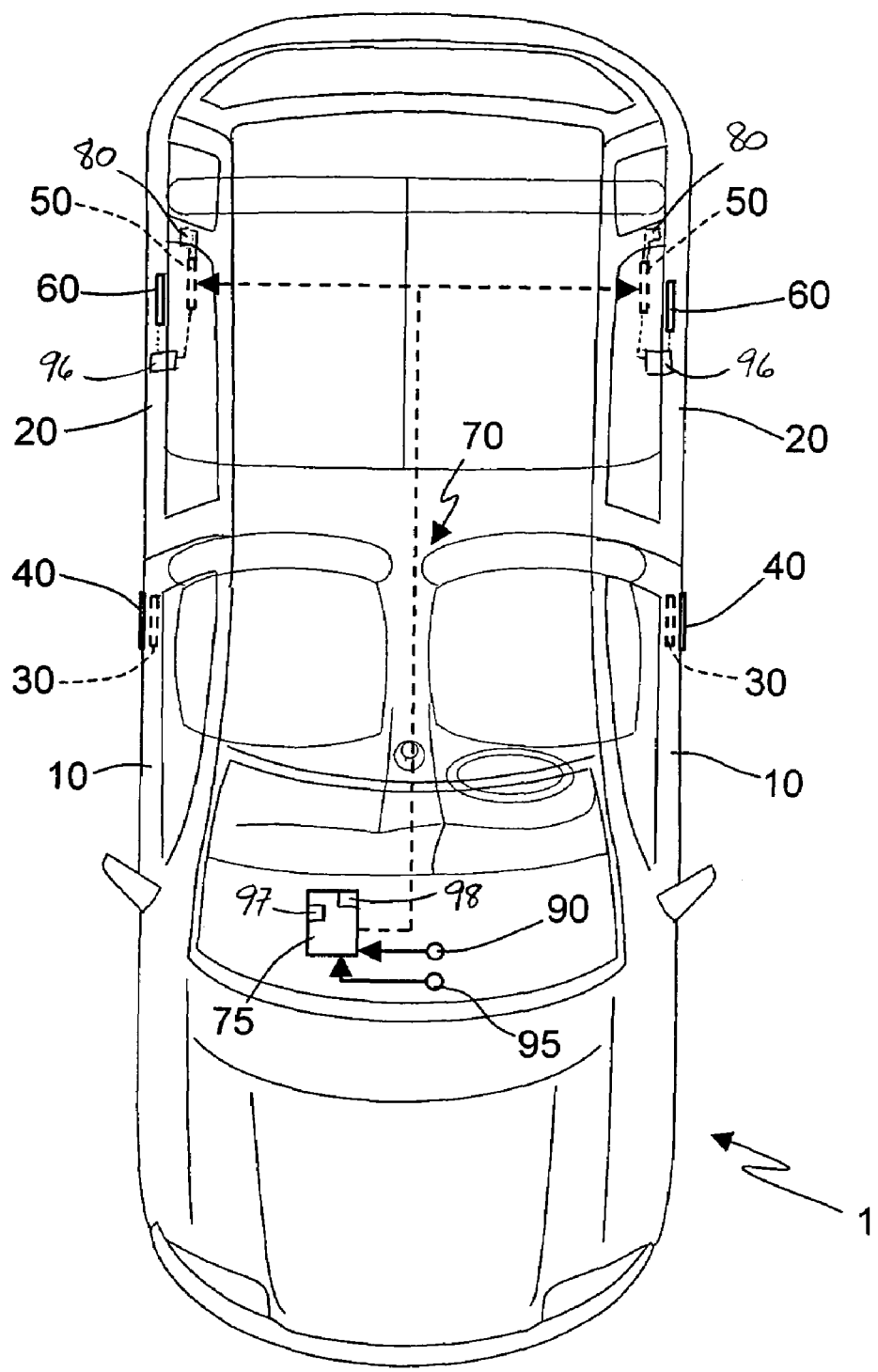
FIG. 1 shows a motor vehicle featuring a child safety lock function control device in accordance with the present invention.

Referring to FIG. 1, the preferred embodiment of the invention includes a motor vehicle, generally shown at 1. The motor vehicle 1 includes a pair of front doors 10 having front inside door handles 30 and front outside door handles 40 for opening the front doors 10 from inside and outside the motor vehicle 1 respectively. The motor vehicle 1 also includes a pair of rear doors 20 having rear inside door handles 50 and rear outside door handles 60 for opening the rear doors 20 from inside and outside the motor vehicle 1 respectively.

A control device, generally shown at 70, is provided to activate and deactivate a child lock safety lock function of the rear doors 20, wherein an electronic central control unit 75 controls a safety lock device 80 connected to the rear inside door handles 50 and provides for two operating modes. The first mode is a normal operating mode, in which the safety lock device 80 is set to a first operating position and the rear doors 20 can be opened using both the rear inside door handles 50 and the rear outside door handles 60. And the second mode is a safety lock mode, in which the safety lock device 80 is set to a second operating position and the rear doors 20 can only be opened using the rear outside door handles 60. In the safety lock mode, any attempt to open the rear doors 20 using the rear inside door handles 50 has no effect. The normal operating mode or the safety lock mode is selected by manually operating a selector device 90 connected to the central control unit 75.

An important aspect of the present invention is the provision of a temporary consent function, which can be activated manually by means of a temporary consent button 95 to temporarily deactivate the safety lock mode, if this has been selected. The temporary consent function is ineffective in the normal operating mode.

Figure 2:
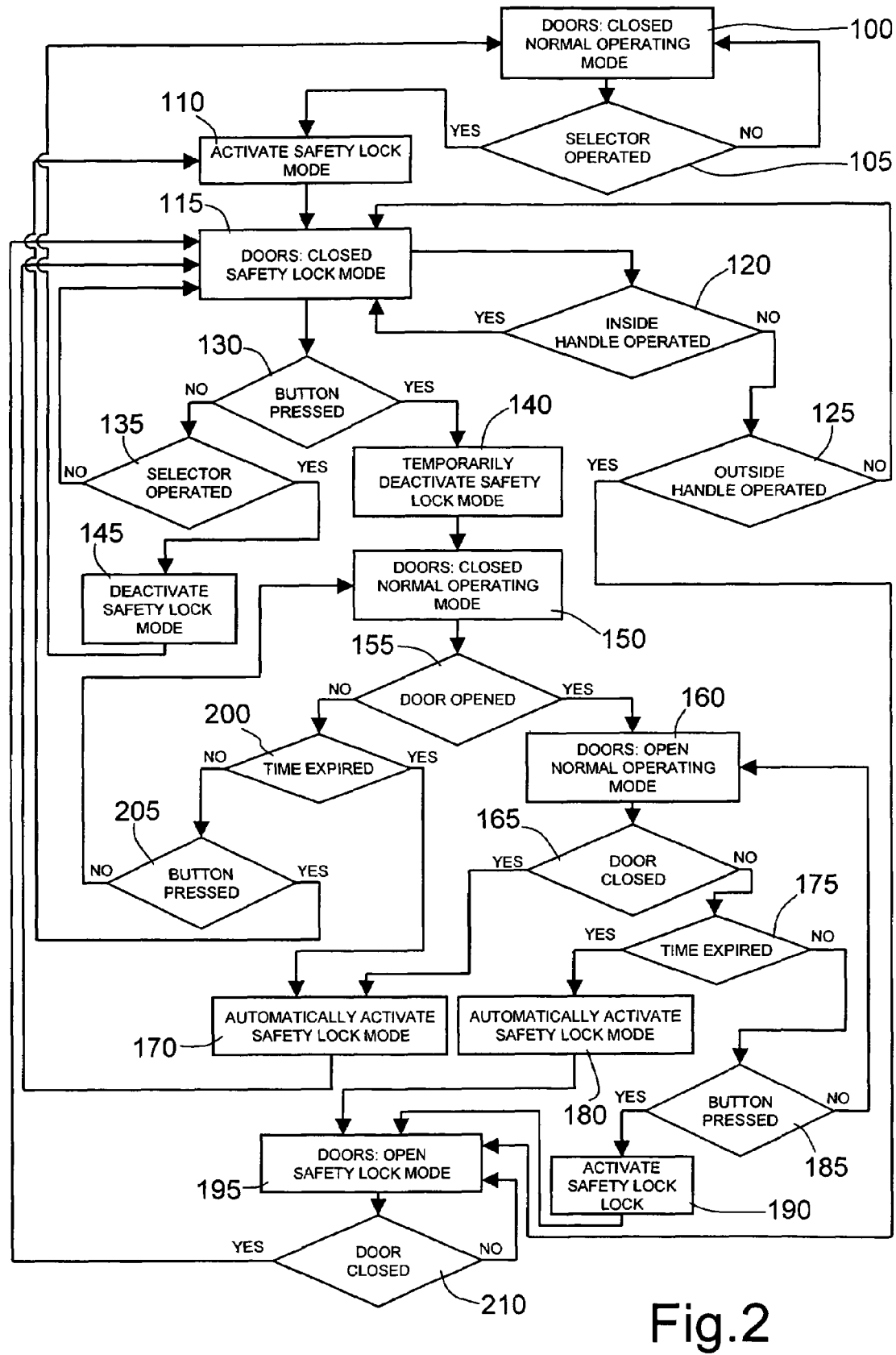
FIG. 2 shows steps in the method according to the present invention.

Referring now to FIG. 2, the flow chart shows the operation of the control device 70. As stated, the control device 70 only acts on the rear doors 20 of the motor vehicle 1, which means the front doors 10 of the motor vehicle 1 can always be opened using the front inside door handles 30, regardless of which mode is selected. The initial conditions of block 100 are the rear doors 20 of the motor vehicle 1 are closed, and the normal operating mode is effective. In the normal operating mode, the rear doors 20 can be opened using both the rear inside door handles 50 and the rear outside door handles 60. Operation of any one of the rear inside or rear outside door handles 50, 60 opens the respective rear door 20.

Block 100 is followed by block 105, which determines whether the selector device 90 has been operated. If the selector device 90 has not been operated (NO output of block 105), block 105 goes back to block 100. Specifically, if none of the rear inside or rear outside door handles 50, 60 are operated to open the rear doors 20, and the selector device 90 is not set to safety lock mode (NO output of block 105), the initial conditions of block 100 are unchanged.

Conversely, if the selector device 90 has been operated (YES output of block 105), block 105 goes on to block 110. Specifically, if the selector device 90 is set to the safety lock mode (YES output of block 105), the central control unit 75 activates the safety lock device 80 to lock the rear doors 20 and prevent them being opened from inside the motor vehicle 1. By the end of this process (block 115), the rear doors 20 are firmly locked.

In the safety lock mode, the rear doors 20 of the motor vehicle 1 are locked from the inside and cannot be opened using the rear inside door handles 50 (YES output of block 120) in which case, the condition in block 115 is unchanged. If, however, instead of using the rear inside door handles 50 (NO output of block 120), the rear outside door handles 60 are used (YES output of block 125), the rear doors 20 open, and a condition is established (block 195) in which the safety lock mode is still operative, but the rear doors 20 are open. Conversely, if no rear outside door handle 60 is operated (NO output of block 125), the rear doors 20 remain closed and the safety lock mode is operative (block 115).

Block 115 is followed by block 130, which determines whether the temporary consent button 95 has been pressed. If the temporary consent button 95 has not been pressed (NO output of block 130), block 130 goes on to block 135. Block 135 determines whether the selector device 90 has been operated to switch from the safety lock mode back to the normal operating mode. If the selector device 90 has not been operated (NO output of block 135), block 135 is followed by block 115, in which the rear doors 20 remain closed and the safety lock mode is operative (block 115). If the selector device 90 has been operated (YES output of block 135), block 135 is followed by block 145, which reactivates the normal operating mode, so that the rear doors 20 can be opened using both the rear inside door handles 50 and the rear outside door handles 60.

Conversely, if the temporary consent button 95 has been pressed (YES output of block 130), block 130 goes on to block 140. Block 140 advantageously provides for temporarily reactivating the normal operating mode, so that the rear doors 20 can be opened using the rear inside door handles 50 as shown in block 150 following block 140. Block 150 is followed by block 155, which determines if a sensor 96 indicates whether the rear doors 20 have been opened using the rear inside door handles 50 or the rear outside door handles 60. If the rear inside or outside door handles 50, 60 have been operated to open the rear doors 20 (YES output of block 155), block 155 goes on to block 160, in which the rear doors 20 are open and the normal operating mode is temporarily operative.

Block 160 is followed by block 165, which determines if the sensor 96 indicates whether at least one of the rear doors 20 has been closed. If one of the rear doors 20 has been closed (YES output of block 165), block 165 goes on to block 170, which reactivates the safety lock mode. In this way, the user can temporarily deactivate the safety lock device 80 using the temporary consent button 95, so that the rear doors 20 can be opened from the rear inside door handles 50, but the safety lock device 80 is automatically activated when the rear doors 20 are closed.

Returning to block 155, if the rear inside door handles 50 are not used (NO output of block 155), block 155 is followed by block 200, which determines if a timer 97 within the central control unit 75 indicates whether a predetermined time, Tmax, has elapsed since entering block 140 by pressing the temporary consent button 95. If the time elapsed is less than Tmax, block 200 is followed by block 205, which determines if a detector 98 within the central control unit 75 indicates whether the temporary consent button 95 has been pressed again. If the temporary consent button 95 has been pressed again, block 205 is followed by block 110, which activates the safety lock device 80. Conversely, if the temporary consent button 95 has not been pressed again, block 205 is followed by block 150. In other words, the first time the temporary consent button 95 is pressed deactivates the safety lock mode, which is reactivated when the temporary consent button 95 is pressed again. On determining that the time elapsed is greater than or equal to Tmax, block 200 is followed by block 170, which reactivates the safety lock mode.

If block 165 determines the sensor 96 indicates that neither of the rear doors 20 have been closed (NO output of block 165), block 165 is followed by block 175 (similar to block 200), which determines if the timer 97 indicates whether the predetermined time, Tmax, has elapsed since entering block 140. If the time elapsed is greater than or equal to Tmax, block 175 goes on to block 180, which reactivates the safety lock device 80 and is followed by block 195. In other words, when the predetermined time interval expires, the safety lock device 80 is reactivated even if one or all of the rear doors 20 are open.

If the time elapsed is less than Tmax, block 175 is followed by block 185 (similar to block 205), which determines if the detector 98 indicates whether the temporary consent button 95 has been pressed. If the temporary consent button 95 has been pressed, block 185 is followed by block 190, which reactivates the safety lock mode and is followed by block 195. Block 195 is followed by block 210, which determines if the sensor 96 indicates whether the rear doors 20 have been closed. If the rear doors 20 have been closed (YES output of block 210), block 115 mode is established and the rear doors 20 are firmly locked. Conversely, if the rear doors 20 have not been closed (NO output of block 210), block 210w goes back to block 195.

On determining that the temporary consent button 95 has not been pressed, block 185 is followed by block 160. In block 160 the rear doors 20 are open, and the normal operating mode is temporarily operative.

If the time elapsed is less than Tmax, block 175 is followed by block 185 (similar to block 205), which determines if the detector 98 indicates whether the temporary consent button 95 has been pressed. If the temporary consent button 95 has been pressed, block 185 is followed by block 190, which reactivates the safety lock mode and is followed by block 195. Block 195 is followed by block 210, which determines if the sensor 96 indicates whether the rear doors 20 have been closed. If the rear doors 20 have been closed (YES output of block 210), block 115 mode is established and the rear doors 20 are firmly locked. Conversely, if the rear doors 20 have not been closed (NO output of block 210), block 210 goes back to block 195.

What is claimed:

1. A control device for activating and deactivating a child safety lock function of rear doors of a motor vehicle having rear inside door handles and rear outside door handles, said control device comprising:
    a safety lock device connected to the rear inside door handles of the rear doors;
    a central control unit for controlling said safety lock device between a first operating position establishing a normal operating mode, in which said safety lock device allows the rear doors to be opened using both the rear inside door handles and the rear outside door handles, and a second operating position establishing a safety lock mode, in which said safety lock device does not allow the rear doors to be opened using the rear inside door handles;
    a selector device for manually selecting between said normal operating mode and said safety lock mode;
    a temporary consent button for manually activating a temporary consent function for temporarily deactivating said safety lock mode, thereby temporarily reactivating said normal operating mode;
    a timer for determining the time lapse since activation of said temporary consent function so as to terminate the temporary deactivation of said safety lock mode upon expiry of a predetermined time; and
    a detector to determine further operation of said temporary consent button during the temporary deactivation of said safety lock mode, whereby said further operation of said temporary consent button terminates the temporary deactivation of said safety lock mode in advance of the expiry of said predetermined time.

2. A control device as set forth in claim 1 including a sensor for determining whether at least one of the rear doors is opened during the temporary deactivation of said safety lock mode, said sensor further determining closure of at least one of the rear doors to command said central control unit to terminate the temporary deactivation of said safety lock mode upon determining closure of at least one of the rear doors.

3. A method of activating and deactivating a child safety lock function of rear doors of a motor vehicle utilizing a safety lock device controllable between a first operating position, defining a normal operating mode, in which the rear doors can be opened using rear inside door handles and rear outside door handles, and a second operating position, defining a safety lock mode, in which the rear doors cannot be opened using the rear inside door handles, the safety lock device including a temporary consent button, the method comprising the steps of:
    controlling the safety lock device between the normal operating mode and the safety lock mode;
    temporarily deactivating the safety lock mode by pressing the temporary consent button, thereby temporarily reactivating the normal operating mode;
    determining the time lapse since temporarily deactivating the safety lock mode so as to terminate the step of temporarily deactivating the safety lock mode upon expiry of a predetermined time; and
    manually terminating the step of temporarily deactivating the safety lock mode by pressing the temporary consent button again, in advance of the expiry of the predetermined time.

4. A method as set forth in claim 3 including the step of sensing whether at least one of the rear doors is opened after the step of temporarily deactivating the safety lock mode.

5. A method as set forth in claim 4 including the step of sensing closure of at least one of the rear doors.

* * * * *